(No Model.)
A. F. DAVIS.
FODDER MILL.
No. 547,848. Patented Oct. 15, 1895.
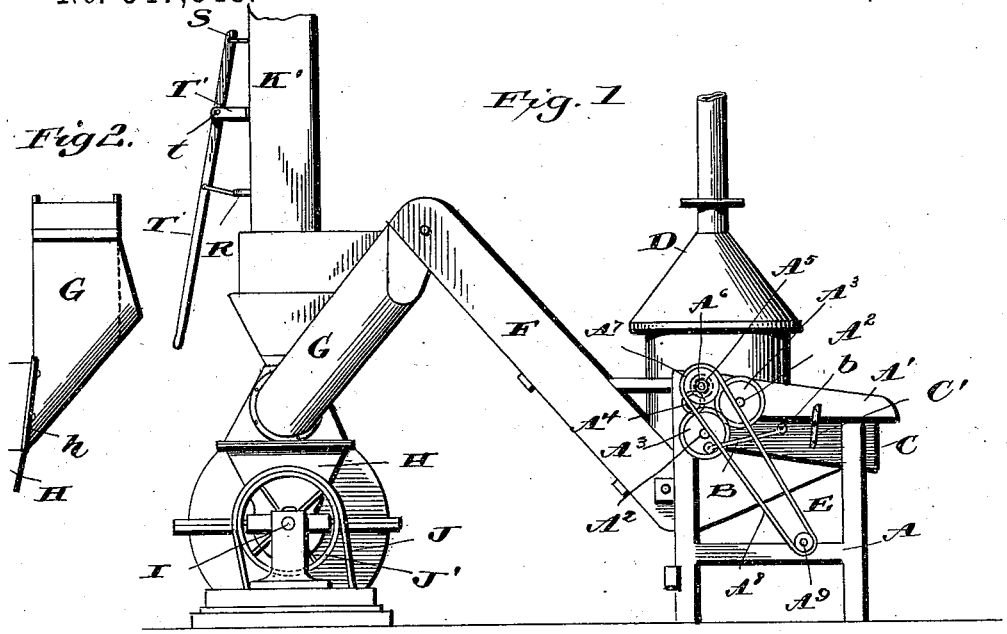
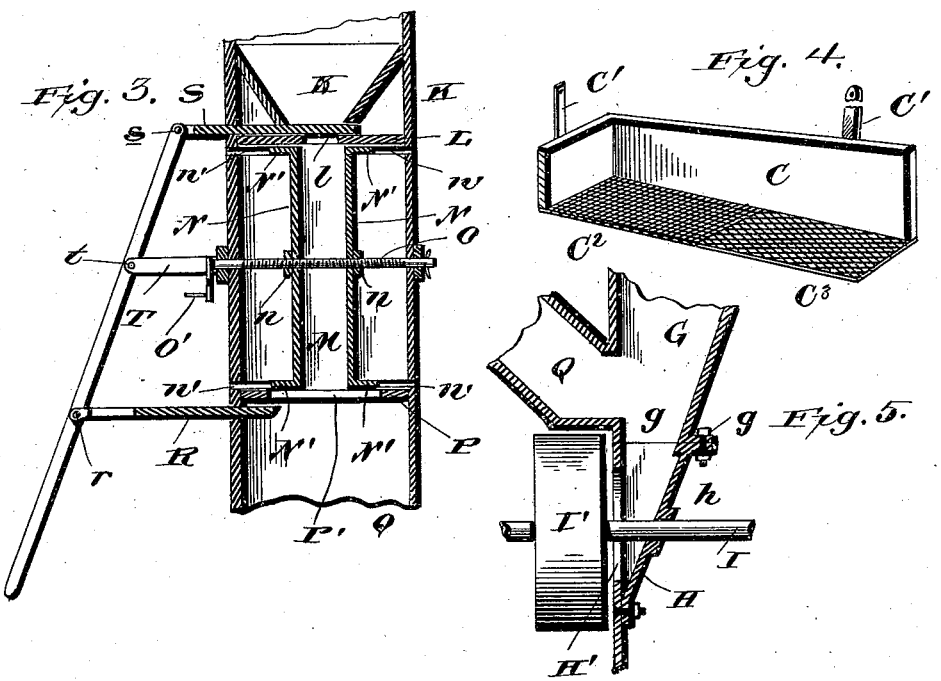
Witnesses:
L. C. Hills
E. K. Bond
Inventor:
Albert F. Davis;
by E. B. Stocking
Atty.

UNITED STATES PATENT OFFICE.

ALBERT F. DAVIS, OF RUTLAND, VERMONT.

FODDER-MILL.

SPECIFICATION forming part of Letters Patent No. 547,848, dated October 15, 1895.

Application filed April 19, 1895. Serial No. 546,406. (No model.)

*To all whom it may concern:*

Be it known that I, ALBERT F. DAVIS, a citizen of the United States, residing at Rutland, in the county of Rutland, State of Vermont, have invented certain new and useful Improvements in Fodder-Mills, of which the following is a specification, reference being had therein to the accompanying drawings.

This invention relates to certain new and useful improvements in devices or mills for grinding and mixing fodder of that class in which chopped hay or other material is mixed with grain or other material and afterward ground to be brought into the best possible condition for feed for animals.

It has for its objects, among others, to provide for the graduation of the chopped material and preventing the passage of any of such material beyond a predetermined length through the machine, whereby all liability of the same to wrap itself around the journal of the grinding device is obviated and a uniform condition of the fodder is obtained.

It has for a further object to provide simple and efficient means for regulating the amount of grain to be fed to the mill to be ground with the chopped hay or other material and for regulating the supply to and from the measuring device.

Still a further object is to provide for the more uniform feeding of the chopped material to the mill and a more even distribution of the same to be mixed with the grain, the conductor for the grain and for the chopped material terminating in a common hopper in proximity to the grinding-disk of the mill where it is ground. I provide a shaking-screen which receives the chopped material from the cutters, this screen having a bottom of different mesh and being open at its lower end, the chopped material being passed through the different meshes of the screen, while any material of more than a predetermined length is shaken over the open end of the screen and again passed through the cutting-knives. The material which passes through the screen is taken up by the conveyer and fed to the spout, which conducts it to the hopper of the mill. The dust from the hay or other material is conducted away by a duster comprehending a suction-fan or a blower or any other suitable device for this purpose. The parts are compactly arranged, so as to occupy a minimum of floor-space, and but little power is required to operate the same. The power may be supplied from above, below, or at the side, as may be deemed best, and, if desired, the cutter may be placed in any part of the building or at a distance therefrom and the cut material fed to the mill by a conveyer or belt or otherwise, as may be deemed most expedient.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a side elevation of my improved mill. Fig. 2 is a front elevation of the spout between the conveyer and the hopper of the mill. Fig. 3 is an enlarged vertical central section through the grain supplying and measuring device. Fig. 4 is an enlarged sectional perspective of the shaking-screen. Fig. 5 is an enlarged detail, partly in elevation and partly in section, of the lower end of the hopper and lower ends of the spouts for the grain and chopped material.

Like letters of reference indicate like parts throughout the several views.

Referring now to the details of the drawings by letter, A designates the support or framework upon which is mounted the feed-table A' and the cutters or rotary knives which are carried by the shaft $A^2$, as seen in Fig. 1, and actuated by the gears $A^3$ upon said shafts, meshing with a small gear $A^4$ on a stub-shaft, and this in turn actuated by the gear $A^5$ on a shaft $A^6$, carrying a pulley $A^7$, actuated by the belt $A^8$, passing around the pulley $A^9$, carried by a shaft which derives its power from any suitable source. (Not shown.) This, however, is but one means which may be employed for actuating the cutting-knives, and I wish to be understood that the invention is not restricted in this particular. One of the gears $A^3$ carries a wrist-pin to which is connected a connecting rod or pitman B, the other end of which is connected, as at $b$, with one of the side walls of the screen C, which is suspended beneath the feed-table in position to receive the hay or other material after it has been acted upon by the cutters, this screen being hung or suspended from the feed-table in any suitable manner—as, for instance, by the strips or hangers C', one or more at the inner end and one upon each side near the front end, as shown. By this means the screen is agitated, as will be readily understood. The bottom of the screen is composed of wire-gauze, perforated metal or wood, or other suitable material having the inner half of a different mesh from that of the outer half, as seen clearly in Fig. 4, in which the portion $C^2$ is shown as of a much finer mesh than the other portion $C^3$, the former being, say, with a mesh of about one inch, while the latter is, say, two and a half inches mesh; but of course these meshes and the relative proportions may be changed without materially departing from the essence of the invention. The bottom of this screen inclines from the inner end toward the outer, which is open, as indicated in Fig. 4, for a purpose which will hereinafter appear.

D is a duster of any suitable nature, designed to remove the dust and lighter particles of refuse from the cutters and screen to prevent its being carried into the mill. The construction and operation of this class of devices is so well understood and so common in devices of this character that any further description thereof is not deemed necessary. Beneath the screen is an oppositely-inclined platform or conductor E, upon which the material falls as it passes through the meshes of the screen, and by which it is conducted to the conveyer F, of any suitable nature and operated in any convenient manner, said elevator being arranged and constructed to convey the material which passes through the screen and down the incline E up to and delivered into the spout G. This spout is of novel shape, as seen in Figs. 1 and 2, being extended near its upper end, so as to provide an incline upon which the material falls, said incline extending from a point back of the vertical line, as indicated by dotted lines in Fig. 2, whereby clogging of the discharge end of the spout is prevented, as the material as it falls must of necessity strike upon an inclined surface and the material, therefore, readily clears itself, so as not to clog the discharge-opening. This discharge-spout joins with and at its lower end receives the grain fed to the mill from the grain-supplying device. In Fig. 5 it is shown as provided with flanges $g$, which may be suitably secured to the hopper H or casting of the mill by bolts or other suitable devices, and this hopper or casting is tapered toward its lower end and upon one wall has a bearing $h$ for the shaft I, carrying the grinding-disk I', the other wall having the opening H', through which the chopped material and grain passes to the action of the disk or disks. The grinding device may be of any well-known or suitable form of construction. It may be a double disk with the disks driven in opposite directions at a high rate of speed or a single disk with the wall of the hopper or casting forming the other grinding-surface. This, however, forms no part of the present invention. The disks or disk may be driven in any suitable manner, as by a belt J, passed around the pulley J' on the shaft I, as seen in Fig. 1. The grain is fed to the mill from a suitable source and is first discharged into the hopper K within the grain spout or casing K', and beneath this hopper is a horizontal partition L, having the opening $l$, which communicates with the measure M, the capacity of which is determined by the movable plates N, which are adjusted simultaneously toward or from each other by the right-and-left screw-threaded rod O, having bearings near its ends in the walls of the spout or casing K', and the right and left threads engage correspondingly-threaded holes in the plates N or in nuts $n$ on the outer faces thereof, all as clearly shown in Fig. 3. These plates have the right-angled flanges N', which work in corresponding guides $n'$, as seen in Fig. 3, and the rod O is designed to be turned in any suitable manner, as by handle O'. The opening P' in the horizontal partition P, located beneath the plates N, serves as the discharge from the measure into the spout Q, which discharges into the lower end of the spout G and into the hopper H, as seen in Fig. 5. The flow of grain into and from the hopper is controlled by means of the slides R and S, the latter closing the exit from the hopper K and the former closing the exit from the measure M. These slides are pivotally connected, as at $r$ and $s$, respectively, with the lever T, which is pivotally connected between its ends, as at $t$, with the bracket or arm T' on the casing K'. These slides are mounted, as will be seen, to move simultaneously in opposite directions, so that when the slide is moved to open the exit from the hopper to the opening $l$ the slide R is moved inward, so as to close the opening P' and permit the measure M to be filled. When the measure is filled, the lever is moved in the opposite direction and the slide S is moved inward and closes the opening $l$, and the exit from the hopper and the slide R is moved outward, so as to permit the grain which has been measured in the measure M to pass out through the opening P' into the spout Q to be mixed with the chopped material and the two passed together to the mill, where they are ground and intimately mixed. If it is desired to have a greater or less proportion of grain, the rod O is turned to move the plates N away from each other or toward each other, and thus change the capacity of the measure M.

Modifications in detail may be resorted to without departing from the spirit of the invention or sacrificing any of its advantages.

What I claim as new is—

1. The combination of a grinder, grain supplying mechanism therefor, a conveyer for the chopped material to said grinder and mechanism for controlling and varying the proportion of grain fed to said grinder, substantially as specified.

2. In a fodder preparing apparatus, the combination of a disintegrating apparatus, a grain supplying mechanism, a grinder constructed and arranged to receive material from the disintegrator and from the grain supplying mechanism simultaneously, and devices for controlling and adjusting or varying the quantity of grain to be supplied, substantially as specified.

3. In a fodder preparing apparatus, the combination of a disintegrating apparatus and grain supplying mechanism, a grinder arranged to receive material from the disintegrator and from the grain supplying mechanism simultaneously, and a screen interposed between the disintegrator and the grinder, substantially as described.

4. In a fodder preparing apparatus, the combination of a disintegrating apparatus and grain supplying mechanism, a grinder arranged to receive material from the disintegrator and from the grain supplying mechanism simultaneously, and a screen interposed between the disintegrator and the grinder, and means for agitating the screen, substantiantially as described.

5. The combination with a disintegrator, an agitating screen beneath the same, means for actuating the same, a rod connected with said screen and with one of the gears of said actuating mechanism, and an oppositely inclined platform for carrying the disintegrated material which passes through the screen to a conveyer, substantially as described.

6. The combination with a casing, horizontal partitions therein having openings, and a horizontally adjustable measuring device between said partitions, substantially as described.

7. The combination with a casing, horizontal partitions therein having openings, an adjustable measuring device between said partitions and adjustable at right angles to the length of the casing, and simultaneously actuated cut-offs working in said casing, substantially as described.

8. The combination with a casing and the hopper therein, of horizontal partitions, simultaneously adjustable plates constituting a measure, and means for actuating said plates.

9. The combination of a casing, of simultaneously adjustable plates therein constituting a measure, and means for actuating said plates to and from each other at right angles to the length of the casing to vary the capacity of the measure, substantially as described.

10. The combination of a casing, simultaneously adjustable plates therein constituting a measure between them, and a right and left threaded rod for simultaneously moving said plates to or from each other to vary the capacity of the space between them, substantially as described.

In testimony whereof I affix my signature in presence of two witnesses.

ALBERT F. DAVIS.

Witnesses:
JAMES RICE,
EDWARD DANA.